W. L. POTTER.
2 Sheets—Sheet 1.
Cooking Stove.
No. 77.
A. I. Patented July 5, 1845.
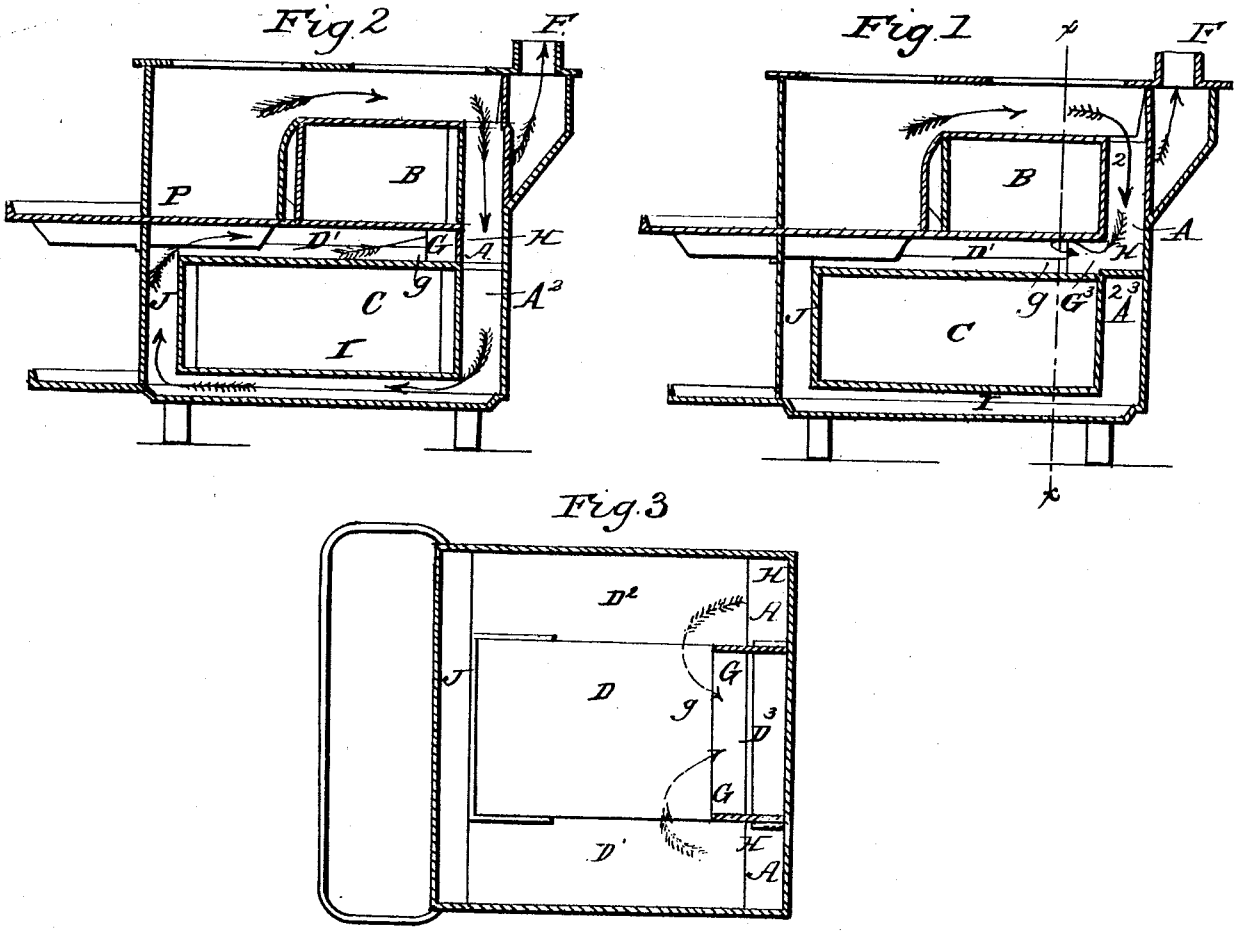
N. PETERS. Photo-Lithographer. Washington, D. C.